Oct. 11, 1960
C. E. TIRRELL  2,955,999
SELF-RECTIFYING ELECTRODIALYSIS UNIT
Filed Sept. 4, 1957
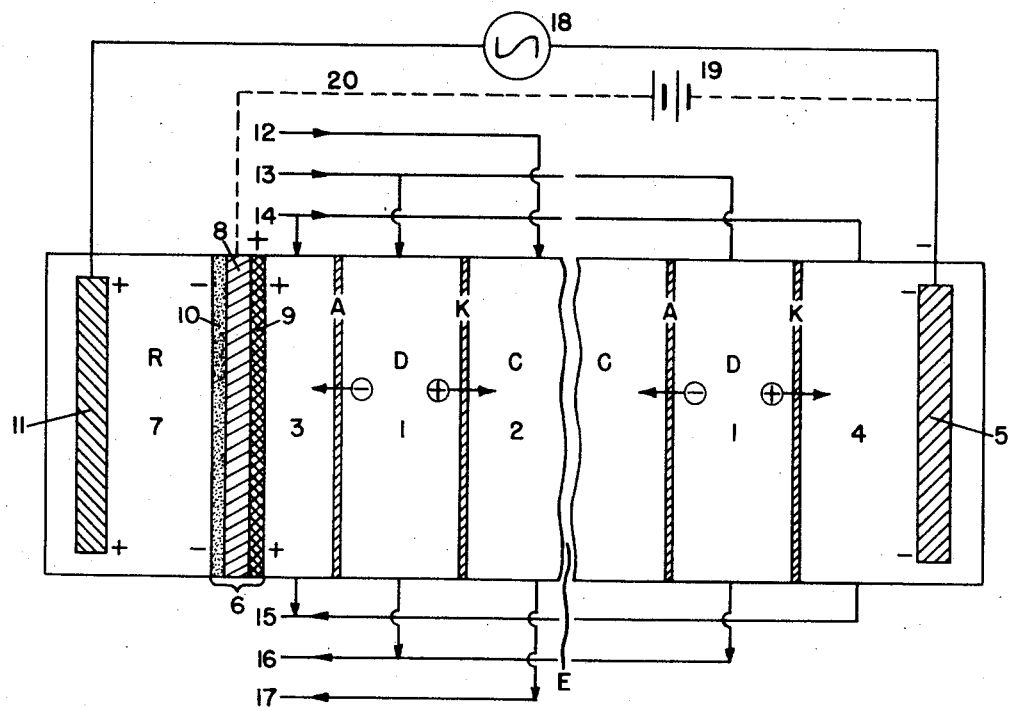
Inventor:
Charles E. Tirrell,
by
Attorney United States Patent Office 2,955,999
Patented Oct. 11, 1960

2,955,999

SELF-RECTIFYING ELECTRODIALYSIS UNIT

Charles E. Tirrell, Nahant, Mass., assignor to Ionics, Incorporated, Cambridge, Mass., a corporation of Massachusetts Filed Sept. 4, 1957, Ser. No. 681,984

20 Claims. (Cl. 204—180)

This invention relates to a method and apparatus for the deionization of electrolyte solutions in an electrodialysis cell and more particularly to a self-rectifying electrodialysis unit to which either an alternating or a direct electric current may be applied.

Electrodialysis units for the deionization of electrolyte solutions are well known. Such units may comprise any number of chambers through which flow one or more electrolyte solutions, said chambers defined by ion-selective membranes, two end electrode chambers, and two electrodes for the application of a direct electric current to the unit. When a direct current is passed through the chambers and the electrolyte solutions therein, ions in the electrolyte solutions migrate toward the electrodes; anions are transferred through anion permselective membranes; and cations are transferred through cation permselective membranes. By alternate disposition of cation and anion permselective membranes between diluting and concentrating chambers, passing electrolyte solutions through such chambers, and applying a direct current to the cell, the electrolyte in the diluting chambers can be continuously diluted and the electrolyte in the concentrating chambers can be continuously concentrated. Cells of this type can be supplied only with direct current, as ion migration in electrolyte solutions must be continuous in one direction.

Though direct electric current is necessary to operate an electro-dialysis unit, the commonly availably power sources are alternating current which must be converted to direct current in a rectifier. The present invention contemplates an electrodialysis unit with a self-contained electro-chemical rectifier, to which unit alternating current from ordinary power sources may be applied.

According to the invention, the electrodialysis chambers and permselective membranes are disposed between two end electrode chambers, a cathode of suitable material such as "Hastelloy" (Ni, Fe, Mo alloy) and a rectifying electrode separating the anode chamber from the rectifying chamber. The rectifying electrode is a sheet of tantalum, coated with platinum on the side contacting the anode chamber and coated with a film of tantalum oxide on the side contacting the rectifying chambers. Adjacent to the rectifying electrode the rectifying chamber contains a concentrated electrolyte, for example 9 N sulfuric acid, which latter is in contact with said rectifying electrode and an anode of a suitable material such as platinum. When alternating current is passed between the anode and the "Hastelloy" cathode, one half wave of the current will be barred from passage through the cell by the layer of tantalum oxide on the tantalum surface in contact with the concentrated electrolyte. Thus only a half-wave of alternating current is passed, giving the effect of half-wave rectification.

An electrodialysis unit in which one electrode of an electrolytic valve metal is coated with a rectifying material was disclosed by German Patent No. 861,993 of 1953. For example if a tantalum electrode is coated with tantalum oxide and an alternating current is applied to the electrodes, current will pass when the tantalum-oxide-coated electrode is a cathode, but current will not pass when the tantalum-oxide-coated electrode is anodic. The layer of tantalum oxide is a rectifier, blocking the flow of current on one direction only; that is it rectifies.

There are several inherent disadvantages to the use of a rectifier as one electrode of an electrodialysis cell. It is known that the oxides of various electrolytic valve metals rectify most efficiently in specific electrolytes, for example aluminum oxide is most efficient in phosphoric acid. Aluminum oxide has optimum rectifying effect in neutral or weakly acidic solutions; however, since hydroxyl ions are produced at the cathode, the pH of the electrode solution may exceed the pH at which aluminum oxide ceases to rectify, i.e. about pH of 9. Great care in rinsing and flushing is therefore required to keep the pH of the cathode solution nearly neutral or slightly acidic. Tantalum oxide has good rectifying action in almost all electrolytes, but it has its best rectifying action in sulfuric acid solution, preferably concentrated. However, if a strong acid is introduced into an electrode chamber, as would be required if the cathode is coated with TaO, diffusion of acid through the membrane into the chambers of the cell would occur, thereby contaminating the diluted product.

In the present invention, these disadvantages are obviated by the use of a separate rectifying chamber containing a solution of strong electrolyte, preferably sulfuric acid, which is separated from the liquids of the cell by an impermeable sheet of an electrolytic valve metal, the oxide of which forms a rectifying film, for example tantalum, coated with the oxide of the valve metal on the surface in contact with the acid and coated with a noble metal, for example platinum, on the surface in contact with the electrolytes in the anode chamber. The plate valve metal sheet serves as a rectifying bipolar electrode; but no diffusion of acid into the cell results, and maximum rectifying effect is obtained. In addition, a direct current, if desired, may be directly applied to the cell through the platinum-coated rectifying electrode and the cathode of "Hastelloy" or other material where rectification of an alternating current is not required.

The object of this invention is to remove the electrolytes from solutions in a more economical manner than is possible by present means.

It is also an object of this invention to remove electrolytes from solutions by applying an alternating current to a self-rectifying electrodialysis unit.

This invention can be more fully understood from the drawing in which a schematic representation of a self-rectifying electrodialysis unit is shown.

The electrodialysis unit for the deionization of electrolyte solutions comprises a plurality of chambers such as alternate diluting 1(D) and concentrating chambers 2(C) defined by alternate anion permselective membranes A and cation permselective membranes K. It is understood that any number of chambers and membranes can be used, for example 200 or more, as indicated at E in the drawing. The electrode chambers of the electrodialysis unit consists of an anode chamber 3 and an end cathode chamber 4. The cathode 5 is a sheet or grid of any suitable cathodic material such as "Hastelloy." The composite rectifying electrode 6 of the electrodialysis unit is disposed as a barrier between the anode chamber 3 and the end rectifying chamber 7(R). The core of the rectifying electrode 6 is a thin sheet of an electrolytic valve metal 8, of the class of tantalum, aluminum, titanium, etc., whose oxides form a rectifying film. Tantalum will be referred to hereinafter as representative and the preferred metal of this group for the purposes of this invention. The thin tantalum sheet 8, for example 0.005 in. thick, is coated with a conductive thin layer 9 of a noble metal, for example platinum on the side defining the anode chamber, and is coated with a thin film of tantalum oxide 10 on the side defining the rectifier chamber 7.

The tantalum sheet can be platinized by painting with a solution of chloroplatinic acid in ether solvent and firing in an open reducing flame as disclosed in patent application Ser. No. 419,621, filed March 29, 1954. The layer of platinum can be made thicker by successive applications of solution. A layer of approximately 0.00001" thick is suitable to protect the tantalum from attack by acid reactions in the anode chamber. The thin film of tantalum oxide 10 may be formed on the surface of the tantalum sheet by making the tantalum sheet anodic in an aqueous electrolyte with direct current or with alternating current. In the latter case, the surface of the tantalum sheet is rapidly electrolytically oxidized when said surface is anodic, that is positively charged with respect to the aqueous electrolyte. The tantalum oxide layer thus formed on the tantalum sheet acts as a half-wave rectifier blocking the passage of the alternating current when the oxide-coated surface of the tantalum sheet is positively charged with respect to the aqueous electrolyte, but passing the current when the oxide-coated surface is negatively charged with respect to the aqueous electrolyte.

The rectifier chamber 7 contains a concentrated electrolyte, for example 9 N sulfuric acid, which is in contact with the tantalum oxide film 10 and an anode 11 of a corrosion-resistant metal, for example platinum, that will not be attacked by acid in the rectifying chamber. Lead is not attacked by sulfuric acid and would also be suitable material for anode 11.

Electrolyte solutions are fed into the concentrating chambers through influent manifold 12, into the diluting chambers through influent manifold 13, and into the electrode chambers through influent manifold 14. The electrolyte is withdrawn from the electrode chambers through effluent manifold 15. The diluted liquid is withdrawn from the diluting chambers through effluent manifold 16, while the concentrated liquid is withdrawn through effluent manifold 17.

An alternating current source 18 is connected to the cathode 5 and the anode 11 whereby the alternating current is rectified by the tantalum oxide film 10 and a half-wave direct current passes between the platinum film 9 as an anode and the cathode 5. Alternatively if no rectification is desired, a direct current source 19 may be connected to the cathode 5 and the rectifying electrode 6 as shown in the drawing by dotted line 20.

When tantalum is made anodic in a suitable aqueous electrolyte such as concentrated sulfuric acid, the surface of the tantalum in contact with the electrolyte is electrolytically oxidized. A thin film of the tantalum oxide forms on the surface with great rapidity. The thickness of the film is directly proportional to the voltage at which it was formed, for example at room temperature 10 volts produce a film approximately 100 A. thick and 100 volts produce a film approximately 1000 A. thick.

If the tantalum continues to be anodized (charged positively with respect to the electrolyte) after formation of the film, only a residual current will persist. The residual current, known as the "leakage current," is due primarily to the presence of non-film forming impurities in the surface of the tantalum. The "leakage current" allowed to pass when the tantalum is anodic is minimal, for example less than 1%. Thus it is apparent that the tantalum oxide film effectively blocks the flow of current in one direction.

However, if the tantalum oxide-coated tantalum is made cathodic, current passes freely. The tantalum oxide film is a barrier to the flow of current in one direction only; thus the film-coated tantalum is a rectifier. When an alternating current is applied to two electrodes, one of which is tantalum, in an aqueous electrolyte, a tantalum oxide film is formed immediately when the tantalum is anodic. The film blocks further passage of current when the tantalum becomes anodic, but current passes freely when the current is reversed and the tantalum is cathodic. The tantalum oxide film is a half-wave rectifier, current passing between the two electrodes in one direction only.

The electro-chemical bipolar rectifier is used to advantage in the present invention by allowing an alternating current to be used in an electrodialysis unit without the expense of separate rectification of the current. It is obvious from the above description that only one half-wave of the alternating current is utilized in a single electrodialysis cell. However, two such cells may be connected so that the other half-wave of the alternating current may be utilized as direct current in the second cell by reversing the leads.

In operation of the apparatus as described above, electrolyte solutions are passed through the diluting, concentrating, and electrode chambers. The rectifying chamber is filled with a strong aqueous electrolyte, 9 N sulfuric acid, since tantalum has the best rectifying action in an electrolyte containing sulphate ions.

The composite rectifying bipolar electrode consists of a tantalum sheet coated with platinum on the side contacting the anode chamber. The surface of the rectifying electrode contacting the rectifying chamber may be coated with a thin film of tantalum oxide in one of two ways. The film of tantalum oxide may be preformed by passing a direct current through the tantalum sheet in such a direction that the surface of the sheet in contact with a strong aqueous electrolyte is anodic, that is charged positively with respect to the electrolyte. Alternatively, the film of tantalum oxide can be formed when the leads from a source of alternating current are connected to the cathode and the platinum anode in the rectifying chamber of the present invention. When the surface of the tantalum in contact with the concentrated sulfuric acid becomes anodic, a film of tantalum oxide is formed instantaneously. The advantage of preforming the rectifying film by a direct current is that the "leakage current" can be accurately measured and the efficiency of the rectifier determined.

To deionize the electrolyte solutions in the diluting chambers, leads from a source of alternating current are connected to the cathode of a suitable material such as "Hastelloy" and the platinum anode in the rectifying chamber. When the platinum anode is anodic, the tantalum oxide layer is cathodic, and current passes through the sulfuric acid. The platinum layer 9 on the tantalum sheet is anodic (charged positively with respect to the tantalum oxide layer) and current passes through the series of chambers and permselective membranes between the platinum layer 9 as an anode and the "Hastelloy" cathode 5. Cations and anions thereby migrate toward the cathode and anode respectively and are transferred through permselective membranes from diluting chambers into adjacent concentrating chambers.

When the applied voltage is reversed, the platinum anode 11 in the rectifying chamber becomes cathodic and the tantalum oxide film is anodic. The anodic oxide film is a barrier to the flow of current, so that no current passes through the electrodialysis unit. The net effect is that the tantalum oxide film functions alternately as a barrier and as a semiconductor; thereby rectifying the applied alternating current.

Ion-selective membranes of types suitable for deionization of electrolyte solutions in the self-rectifying electrodialysis unit described above have been disclosed in U.S. Patent No. 2,636,851 and U.S. Patent No. 2,730,768.

The following example serves to illustrate the principles and preferred embodiments of the invention, but it is understood that the invention is not limited thereto.

Example 1

Brackish water was demineralized in a self-rectifying electrodialysis unit smilar to the unit shown in the drawing. The unit contained ten repeating pairs of one diluting and one concentrating chamber between a "Hastelloy" cathode and a rectifying electrode of platinum-coated tantalum. The diluting and concentrating chambers were defined by ion selective membranes, cation selective membranes of a sulfonated copolymer of styrene and divinyl benzene, and the anion selecttive membrane of a quaternized copolymer of pyridine and poylvinyl benzene which has been halo-alkylated and aminated. The memberane area per cell pair was 210 square centimeters.

The rectifying chamber separated from the anode chamber by the sheet of platinum-coated tantalum, contained a solution of 9 N $H_2SO_4$ and an anode of platinum. A rectifying film of tantalum oxide was preformed on the surface of the tantalum sheet in contact with the rectifying chamber by passing a direct current bewteen the tantalum sheet and the platinum anode so that the tantalum sheet was anodic.

The brackish water to be demineralized contained 2000 parts per million NaCl (0.034 N). Brackish feed water was passed through the diluting chambers at a rate of 1500 ml. per minute and through the concentrating chambers at a rate of 1500 ml. per minute. Brackish water was also passed through the electrode chambers, but was acidified with 0.01 N HCl before being fed to the cathode chamber.

Alternating current at 115 volts and 2.0 amperes was applied to a variable voltage transformer to produce the proper cell voltage. Leads from the transformer were connected to the "Hasetelloy" cathode and the platinum anode of the self-rectifying unit; the current was rectified by the rectifying tantalum oxide film, producing a direct current of 4.5 amperes at 40 volts through the electrodialysis cells.

The effluent stream from the diluting chamber contained 1000 parts per million of NaCl (0.017 N), while the effluent from the concentrating chambers contained 3000 parts per million of NaCl (0.051 N). The brackish feed water, originally containing 2000 parts per million NaCl, was 50% demineralized by the self-rectifying electrodialysis unit to which alternating line current was applied.

Having thus disclosed my invention and described in detail preferred embodiments thereof, I claim and desire to secure by Letters Patent:

1. The apparatus for the deionization of electrolyte solutions comprising a plurality of diluting and concentrating chambers defined by ion selective membranes, an end cathode chamber, an opposite-end rectifying chamber, an anode chamber adjacent thereto, said anode chamber separated from said rectifying chamber by a rectifying electrode, said rectifying electrode comprising a sheet of electrolytic valve metal the oxide of which forms a semiconductive film, said valve metal sheet coated on the side the anode chamber with a layer of noble metal, and coated on the side contacting the rectifying chamber with a film of oxide of said valve metal, said rectifying chamber being adapted to contain an aqueous electrolyte, an anode of corrosion-resistant metal in said rectifying chamber, means for passing electrolyte solutions through electrode chambers, diluting chambers and concentrating chambers, and means for connecting an alternating current source to the cathode and the anode.

2. The apparatus of claim 1 in which the sheet of electrolytic valve metal is selected from the group consisting of tantalum, aluminum, and titanium.

3. The apparatus of claim 1 in which the sheet of electrolytic valve metal is tantalum, the rectifying film is tantalum oxide, and the noble metal coating is platinum.

4. The apparatus of claim 1 in which the sheet of electrolytic valve metal is aluminum, the rectifying film is aluminum oxide, and the noble metal coating is platinum.

5. The apparatus for the deionization of electrolyte solutions comprising a plurality of diluting and concentrating chambers defined by ion-selective membranes, an end cathode chamber, an opposite-end rectifying chamber, an anode chamber, said anode chamber separated from said rectifying chamber by a rectifying electrode, acting as a bipolar electrode, said rectifying electrode comprising a sheet of electrolytic valve metal, the oxide of which forms a rectifying film, said valve metal sheet coated on the side contacting the anode chamber with a layer of noble metal, said rectifying chamber being adapted to contain an aqueous electrolyte, an anode of corrosion-resistant metal in said rectifying chamber, means for passing electrolyte solutions through electrode chambers, diluting chambers and concentrating chambers, and means for connecting an alternating current source to the cathode and the anode.

6. The apparatus of claim 5 in which the sheet of electrolytic valve metal is selected from the group consisting of tantalum, aluminum, and titanium.

7. The apparatus of claim 5 in which the sheet of electrolytic valve metal is tantalum and the noble metal coating is platinum.

8. The apparatus of claim 5 in which the sheet of electrolytic valve metal is aluminum and the noble metal coating is platinum.

9. In the method of electrodialyzing electrolyte solutions in a apparatus having diluting and concentrating chambers defined by permselective membranes, an end cathode chamber, an opposite end rectifying chamber, an anode chamber, said anode chamber separated from said rectifying chamber by a rectifying electrode, said rectifying electrode comprising a sheet of electrolytic valve metal, the oxide of which forms a rectifying film, coated on the side contacting the anode chamber with a layer of noble metal, said rectifying chamber containing an aqueous electrolyte, an anode of a corrosion-resistant metal in said rectifying chamber, the steps of passing an alternating electric current through said cathode and anode, instantaneously forming a rectifying film of the oxide of said valve metal on the side of the valve metal sheet contacting the rectifying chamber, and thereby causing rectification of said current by said rectifying film of valve metal oxide.

10. In the method of claim 9 wherein the rectifying film of the oxide of said electrolytic valve metal is preformed by passing a direct current through the sheet of electrolytic valve metal in an aqueous electrolyte in a direction to cause the metal sheet to become an anode.

11. In the method of claim 9 wherein the alternating current is rectified by a film of the oxide of an electrolytic valve metal selected from the group consisting of tantalum, aluminum, and titanium.

12. In the method of claim 9 wherein the alternating current is rectified by a film of tantalum oxide on a sheet of tantalum, said sheet being coated with platinum on the surface contacting the anode chamber.

13. In the method of claim 9 wherein the alternating current is rectified by a film of aluminum oxide on a sheet of aluminum, said sheet being coated with platinum on the surface contacting the anode chamber.

14. A composite rectifying bipolar electrode comprising a sheet of electrolytic valve metal completely coated on one surface with a rectifying film of the oxide of said valve metal as a cathode, and completely coated on the other opposite surface with a layer of noble metal as an anode, said composite electrode being adapted for use as a rectifying electrode in alternating current electrolytic and electrodialytic cells.

15. A composite rectifying bipolar electrode comprising a sheet of a valve metal selected from the group consisting of tantalum, aluminum, and titanium, said metal sheet completely coated on one surface with a film of the oxide of that metal as a cathode and completely coated on the other opposite surface with a layer of noble metal as an anode, said composite electrode being adapted for use as a rectifying electrode in alternating current electrolytic and electrodialytic cells.

16. The composite rectifying bipolar electrode of claim 14 wherein the electrolytic valve metal is tantalum, the rectifying film is tantalum oxide, and the noble metal is platinum, said composite electrode being adapted for use as a rectifying electrode in alternating current electrolytic and electrodialytic cells.

17. The composite rectifying bipolar electrode of claim 14 wherein the electrolytic valve metal is aluminum, the rectifying film is aluminum oxide, and the noble metal is platinum, said composite electrode being adapted for use as a rectifying electrode in alternating current electrolytic and electrodialytic cells.

18. The apparatus of claim 5 in which the sheet of electrolytic valve metal is titanium and the noble metal coating is platinum.

19. The method of claim 9 wherein the current is rectified by a film of titanium oxide on a sheet of titanium, said sheet being completely coated with platinum on the surface contacting the anode chamber.

20. The composite rectifying electrode of claim 14 wherein the electrolytic valve metal is titanium, the rectifying film is titanium oxide, and the noble metal is platinum.

References Cited in the file of this patent

UNITED STATES PATENTS

| | | |
|---|---|---|
| 1,477,099 | Baum | Dec. 11, 1923 |
| 2,835,632 | Kollsman | May 20, 1958 |

FOREIGN PATENTS

| | | |
|---|---|---|
| 485,089 | Great Britain | May 13, 1938 |
| 829,891 | France | July 8, 1938 |